(12) United States Patent
Yamada et al.

(10) Patent No.: US 8,390,870 B2
(45) Date of Patent: Mar. 5, 2013

(54) RECORDING APPARATUS, CONTROL METHOD THEREFOR, PROGRAM, AND COMPUTER-READABLE STORAGE MEDIUM FOR PRINTING ON SURFACE

(75) Inventors: Akitoshi Yamada, Yokohama (JP); Mitsuhiro Ono, Tokyo (JP); Masao Kato, Kawasaki (JP); Fumihiro Goto, Kawasaki (JP); Tetsuya Suwa, Yokohama (JP); Fumitaka Goto, Tokyo (JP); Yusuke Hashii, Kawasaki (JP); Arata Miyagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 976 days.

(21) Appl. No.: 11/768,326

(22) Filed: Jun. 26, 2007

(65) Prior Publication Data

US 2007/0297008 A1    Dec. 27, 2007

(30) Foreign Application Priority Data

Jun. 27, 2006 (JP) ................................ 2006-177294

(51) Int. Cl.
*G06K 15/00* (2006.01)
(52) U.S. Cl. ................. 358/1.18; 369/53.21; 347/2
(58) Field of Classification Search ................. 358/1.18; 369/53.21; 347/2
See application file for complete search history.

(56) References Cited

U.S. PATENT DOCUMENTS

| | | | |
|---|---|---|---|
| 7,418,196 B2 | 8/2008 | Yoshida | |
| 2003/0088518 A1* | 5/2003 | Kirk et al. | 705/62 |
| 2004/0061876 A1* | 4/2004 | Iida | 358/1.5 |
| 2006/0077825 A1 | 4/2006 | Nonaka et al. | |
| 2007/0143443 A1* | 6/2007 | Johannsen | 709/218 |
| 2008/0030780 A1* | 2/2008 | Izawa | 358/1.16 |

FOREIGN PATENT DOCUMENTS

| | | |
|---|---|---|
| JP | 2002-108365 A | 4/2002 |
| JP | 2004-334833 A | 11/2004 |
| JP | 2005-161867 | 6/2005 |
| JP | 2005-167742 A | 6/2005 |
| JP | 2006-099922 | 4/2006 |
| JP | 2006-114090 A | 4/2006 |
| WO | 2005-096240 A | 10/2005 |

OTHER PUBLICATIONS

Nov. 19, 2010 Japanese Office Action, which is enclosed without English Translation, that issued in Japanese Patent Application No. 2006-177294.

* cited by examiner

*Primary Examiner* — Benny Tieu
*Assistant Examiner* — Qian Yang
(74) *Attorney, Agent, or Firm* — Cowan, Liebowitz & Latman, P.C.

(57) ABSTRACT

A recording apparatus comprises a writing unit adapted to write data on a recording medium, a selection unit adapted to select data to be written on the recording medium from a storage medium configured to store a plurality of data, and a display control unit adapted to cause a display device to display a display screen concerning printing before the data selected by said selection unit is copied from the storage medium onto the recording medium, wherein said display control unit causes the display unit to display the display screen if there is a restriction on the number of times of copying of the data.

14 Claims, 10 Drawing Sheets

FIG. 3

| BROADCAST PROGRAM ID | PROGRAM INFORMATION | LABEL PRINTING INFORMATION | WARNING LOG |
|---|---|---|---|
| #1 | Copy Once | UNDONE | UNDONE |
| #2 | Copy Free | UNDONE | UNDONE |
| #3 | Copy Once | DONE | UNDONE |
| #4 | Copy Free | DONE | UNDONE |
| #5 | Copy Once | UNDONE | DONE |
| #6 | Copy Free | UNDONE | DONE |
| #7 | Copy Once | DONE | DONE |
| #8 | Copy Free | DONE | DONE |

RECORDING APPARATUS, CONTROL METHOD THEREFOR, PROGRAM, AND COMPUTER-READABLE STORAGE MEDIUM FOR PRINTING ON SURFACE

BACKGROUND OF THE INVENTION

1. Field of the Invention

The present invention relates to a user interface technique used when recording multimedia data such as a recorded program on a recording medium.

2. Description of the Related Art

Conventionally, an HD-DVD video recorder comprising an HDD (Hard Disk Drive) and a DVD (Digital Versatile Disk) drive is known. This HD-DVD video recorder temporarily records, on the HDD, a broadcast program or the like received through the tuner, and copies and writes the broadcast program recorded on the HDD onto a DVD. Recently, with advances in techniques such as DRM (Digital Rights Management) and Copy Once accompanying an increase in awareness of copyright protection for broadcast programs, restrictions have been imposed on the contents of programs to be written on DVDs, the number of times of writing, and the like in consideration of copyright protection. A restriction on the number of times of writing called Copy Once, in particular, has been widely employed as a technique of allowing, upon temporarily recording a broadcast program on a recording medium such as an HDD, to write the copy data onto another recording medium only once.

Recent printers have a label printing function of printing information such as images and characters on the label printing surfaces of DVDs and CD-Rs. Using this function makes it possible to print an arbitrary character string or image on a DVD (see, for example, Japanese Patent Laid-Open No. 2005-161867).

FIG. 10 is a flowchart showing each of processes concerning broadcast programs, that is, recording, reproduction, writing, and label printing, performed by a personal computer with a conventional program recording function.

Referring to FIG. 10, this system executes one of the following processes: "1: record", "2: reproduce", "3: write", and "4: print label", in accordance with an operation instruction issued by a user using an operation unit such as a remote controller (S7001).

"1: record" is the operation of storing a broadcast program or the like in an HDD. When the user selects "1: record", the system activates the recording module in step S7101 to record a program in step S7102. At the same time, the system saves the program in the HDD in correspondence with a program ID for identifying the recorded program at the time of reproduction, writing, and printing processes for the recorded program. When recording is complete, the process returns to step S7001.

"2: reproduce" is the operation of reproducing the program recorded on the HDD on a TV set or the like. When the user selects "2: reproduce", the system activates the reproducing module in step S7021 to reproduce the recorded program. When reproduction is complete, the process returns to step S7001.

"3: write" is the operation of selecting an arbitrary program from one or more programs recorded on the HDD and writing the selected program on a recording medium such as a DVD. The system starts the function of "3: write" by activating application software for writing data on a DVD. When the user issues a write instruction by performing various operations, the system activates the writing module (S7301) to write the program on a recording medium (S7309). Upon completion of writing, the process returns to step S7001. At this time, when writing a program which is copyright-protected (based on, for example, the Copy Once function), the system erases the program saved in the HDD to prevent it from being copied without restriction.

"4: print label" is the operation of printing a label on a DVD. The system starts the function of "4: print label" by activating application software for label printing. When the user issues a print instruction by performing various operations, the system activates the printing module (S7401) to output a print command to the printer to print a label on a DVD. When the printer finishes label printing, the process returns to step S7001.

As described above, such a conventional system writes a recorded program on a DVD independently of label printing. That is, the system does not perform these operations as associated operations. In a practical operating environment, when printing a label on a DVD, the system sometimes cannot print the desired label because of a print failure due to an ink shortage, misregistration, the use of an inappropriate medium, disconnection of the cable, or the like.

Assume that the system has already written restriction information for copyright protection in a DVD which has suffered a print failure as described above. In this case, since the above restriction information restricts the degree of freedom of operation such as data copying or moving operation, it is expected that the user cannot write the same program again on a DVD on which a label is properly printed. That is, when a print failure occurs on a DVD or the like on which copy data has been written once, the user sometimes cannot copy the same data on the DVD even if he/she tries to generate a DVD on which a label is properly printed.

SUMMARY OF THE INVENTION

The present invention has been made to solve the above problem and, has as its object to implement a technique which can make a user be conscious of label printing on a recording medium before writing of a recorded program or the like on the recording medium, and allows to properly and reliably write the recorded program on the recording medium and print a label on it.

According to the present invention, there is provided a recording apparatus comprising: a writing unit adapted to write data on a recording medium; a selection unit adapted to select data to be written on the recording medium from a storage medium configured to store a plurality of data; and a display control unit adapted to cause a display device to display a display screen concerning printing before the data selected by the selection unit is copied from the storage medium onto the recording medium, wherein the display control unit causes the display unit to display the display screen if there is a restriction on the number of times of copying of the data.

According to the present invention, there is provided a control method of recording apparatus, the method comprising the steps of: writing data on a recording medium; selecting data to be written on the recording medium from a storage medium configured to store a plurality of data; and displaying, if there is a restriction on the number of times of copying of the data, a display screen concerning printing on a display device, before the data selected in the selecting step is copied and written from the storage medium onto the recording medium.

According to the present invention, making a display apparatus display a display screen concerning printing on the printing surface of a recording medium before writing a recorded program or the like on the recording medium makes it possible to make a user be conscious of printing on the printing surface before writing on the medium. This greatly helps to write a recorded program (multimedia data) on a recording medium on which a label is properly printed.

Further features of the present invention will become apparent from the following description of exemplary embodiments with reference to the attached drawings.

BRIEF DESCRIPTION OF THE DRAWINGS

FIG. 3 is a view exemplifying the contents of a label printing management table;

DESCRIPTION OF THE EMBODIMENTS

The best mode for carrying out the present invention will be described in detail below with reference to the accompanying drawings.

Note that an embodiment to be described below is merely an example of implementing the present invention, and should be modified or changed, as needed, depending on the arrangement of an apparatus to which the present invention is applied and various conditions. The present invention is not limited to the following embodiments.

[System Arrangement]

Figure 1:
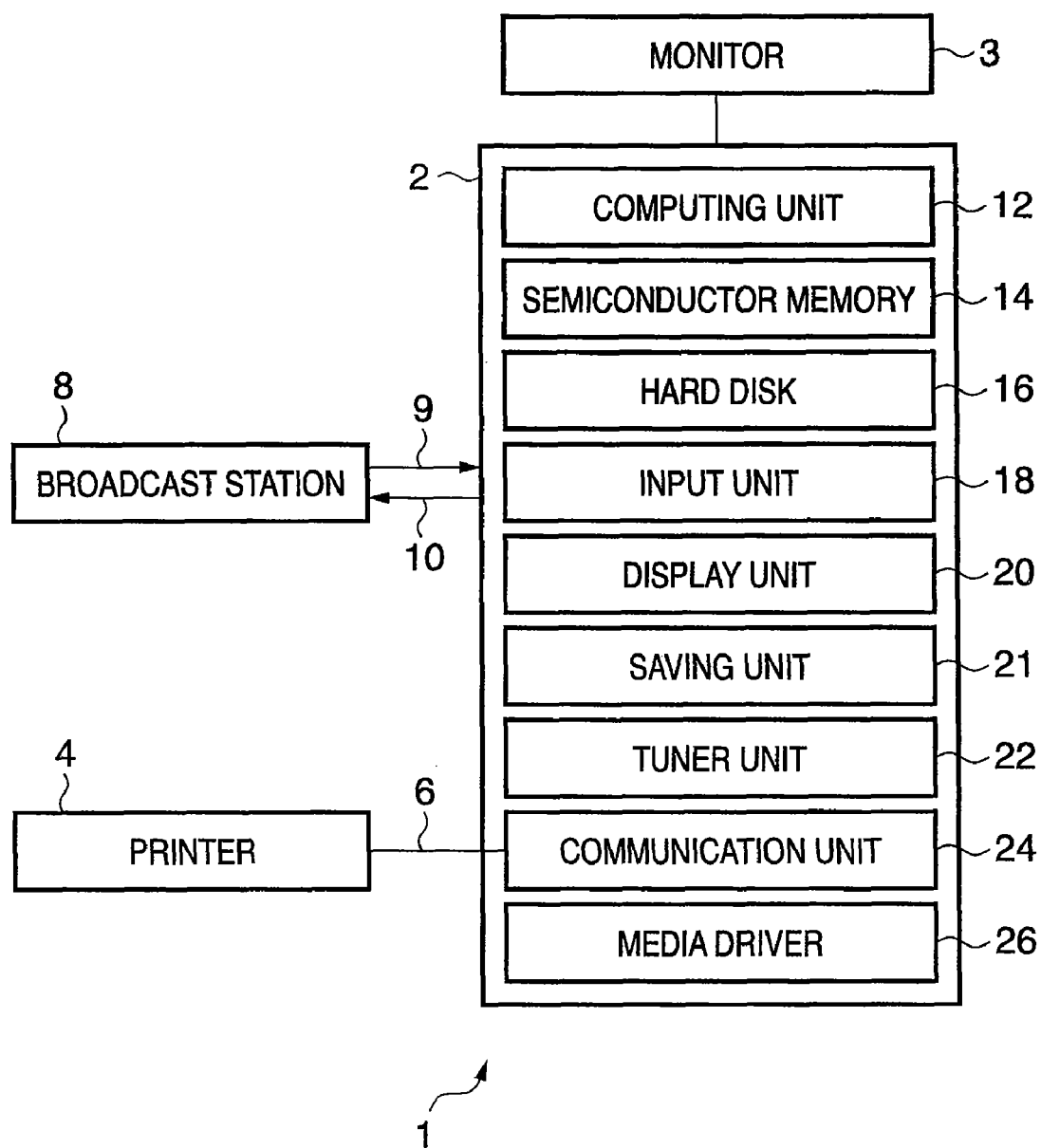
FIG. 1 is a block diagram showing the arrangement of a label printing system according to an embodiment of the present invention.

FIG. 1 is a block diagram showing the arrangement of a label printing system according to an embodiment of the present invention.

Referring to FIG. 1, a label printing system 1 of this embodiment comprises a recording/reproducing apparatus 2 which performs recording, reproducing, writing, and label printing of multimedia data such as a digital broadcast program broadcast from a broadcast station 8 and a printer 4 communicatively connecting to the recording/reproducing apparatus 2.

The recording/reproducing apparatus 2 comprises a computing unit 12 which performs various kinds of computations during the operation of the apparatus, a semiconductor memory (to be referred to as a memory) 14 including a volatile memory which temporarily stores a broadcast program 9 broadcast from the broadcast station 8, program information 10 transmitted to the broadcast station 8, printing information 6 transmitted to a printer 4, and the like, a nonvolatile memory which stores various programs, an input unit 18 which receives instructions from the user, a display unit 20 which notifies the user of a power supply state or an operation state, reproduces a recorded program (multimedia data) on an externally connected monitor 3, and displays a user interface (UI) window, a tuner unit 22 which receives the broadcast program 9, a saving unit 21 which saves the broadcast program 9 on a hard disk 16, a communication unit 24 which transmits a print command and the printing information 6 to the printer 4, and a media driver 26 which writes the broadcast program 9 on a recording medium such as a DVD.

Figure 2:
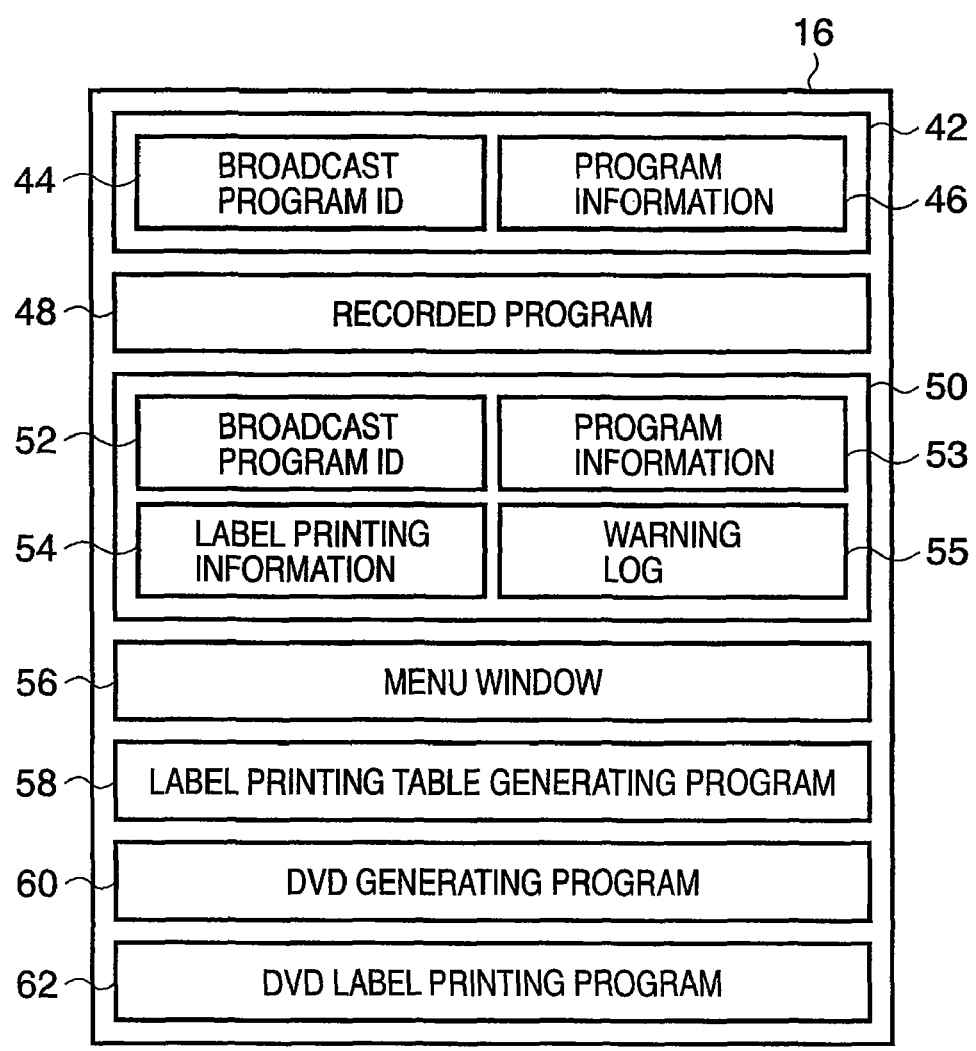
FIG. 2 is a view exemplifying information saved in a hard disk or a memory.

FIG. 2 exemplifies the information saved in the hard disk 16 or the memory 14.

A nonvolatile memory area in the hard disk 16 or memory 14 stores a program information storage portion 42 which acquires the program information 10 corresponding to the broadcast program 9 and stores a broadcast program ID 44 and program information 46 including copyright protection information and the like, a label printing table generating program 58 which generates a label printing management table 50 storing a broadcast program ID 52, program information 53, label printing information 54, and warning log 55 for label printing, and a DVD label printing program 62 which generates printing information for label printing. The DVD label printing program 62 generates the label printing information 54 of the broadcast program 9 from a broadcast program body, thumbnail image, and the like, and transmits the information to the printer 4 through the communication unit 24, thereby printing a label on the label printing surface of a DVD. The information printed on the printing surface preferably includes one of pieces of information concerning the date of the program (multimedia data), the image extracted from the multimedia data, and the title to allow the user to comprehend the contents of the program.

The media driver 26 writes the broadcast program 9 designated by a DVD generating program 60 from the hard disk 16 on a recording medium.

The recording medium is an optical disk such as a DVD. The label printing system 1 of this embodiment complies with DVD standards such as BlueRayDisk, HDDVD, and DVD-Video.

In the label printing system 1 of this embodiment, the program information 46 is information included in an electronic program table broadcast in correspondence with the broadcast program 9.

FIG. 3 exemplifies the contents of the label printing management table 50.

This table saves the program information 53, label printing information 54, and warning log 55 in correspondence with the broadcast program ID 52. The program information 53 includes restriction information (Copy Once) representing whether writing of the program on a medium a plurality of number of times is inhibited from the viewpoint of copyright protection. The label printing information 54 includes information indicating whether label printing corresponding to each broadcast program has already been performed. In addition, the warning log 55 includes information representing whether a warning concerning label printing (to be described later) has been made before writing of each broadcast program on a medium.

Warning processing at the time of label printing performed by the printing system of this embodiment will be described in detail below. Note that the recording/reproducing apparatus 2 executes the flowcharts to be described below in accordance with the respective pieces of information and programs shown in FIGS. 2 and 3.

[First Embodiment]

Figure 4:
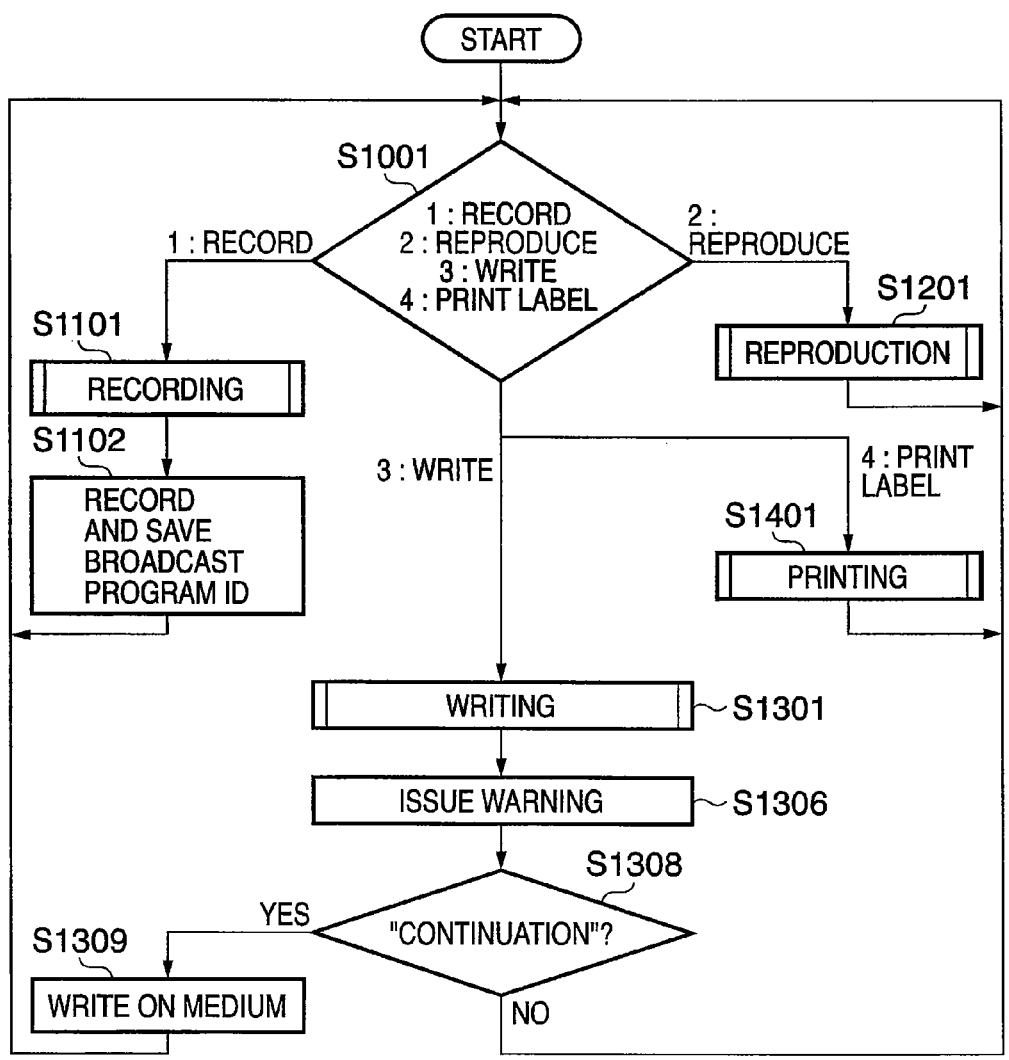
FIG. 4 is a flowchart showing warning processing at the time of label printing in the first embodiment.

FIG. 4 is a flowchart showing warning processing at the time of label printing in the first embodiment.

This embodiment issues a warning to prompt the user to perform label printing before writing a recorded program (multimedia data) on a recording medium, that is, the warning "you should perform label printing before writing on a medium".

Figure 10:
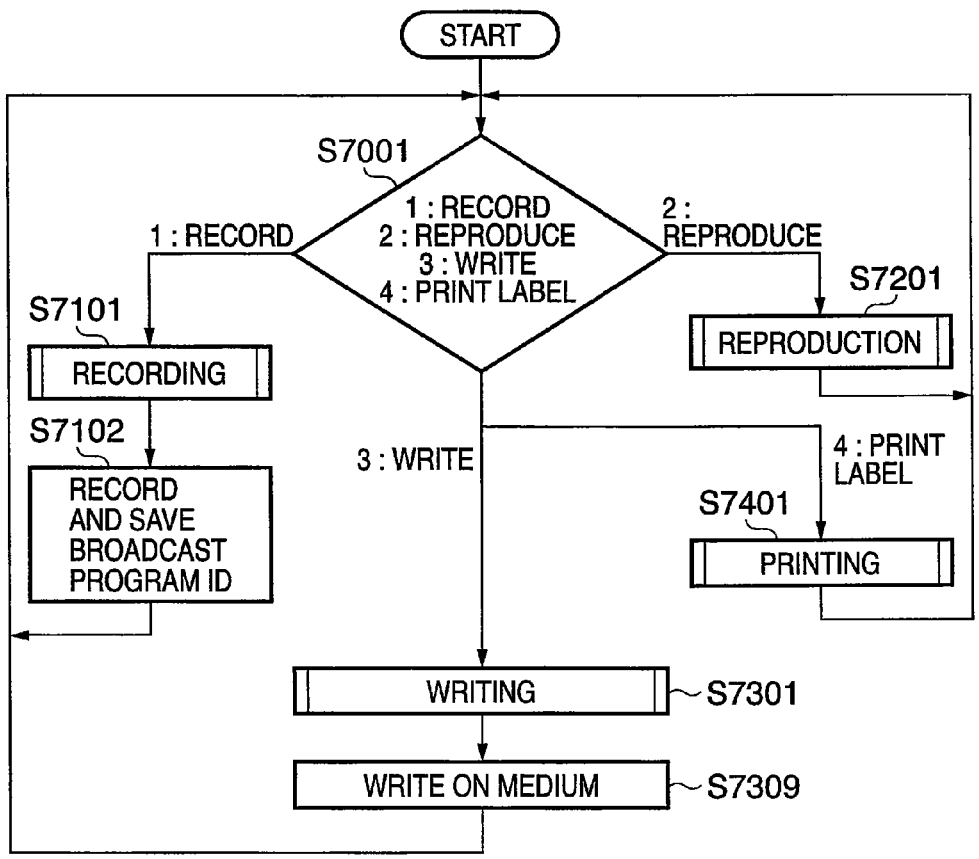
FIG. 10 is a flowchart showing recording/reproducing/writing/label printing processes performed by a conventional system.

The operations in steps S1001, S1101, S1102, S1201, S1301, S1309, and S1401 in FIG. 4 are the same as those in steps S7001, S7101, S7102, S7201, S7301, S7309, and S7401 described with reference to FIG. 10, and hence a repetitive description will be omitted.

When the use selects "3: write" in step S1001 in FIG. 4, this system activates the writing module (S1301) to issue the warning "you should perform label before writing on a medium" (S1306). The system issues this warning by displaying, on a monitor 3, a display screen concerning printing on the printing surface of a recording medium. In accordance with this warning, the user inputs "continuation" or "cancellation" through an input unit 18. Note that this display screen may be displayed in the form of a display indicating an unprinted state when no label is printed on the printing surface or a display for the confirmation of the execution of printing of multimedia data in a printed state at that time as well as a display for prompting to print a label on the printing surface. In addition, this operation may be performed in the form of a display for the execution of printing of multimedia data when it is clear that label printing on the printing surface is complete or a display simply indicating that label printing is complete. Any of these displays allows the user to be conscious of label printing on the printing surface of a medium before writing on the medium. This greatly helps to write a recorded program (multimedia data) on a printing medium on which a label has been properly printed.

The above display screen may be displayed on the entire display or may be displayed on part of the display in the form of a window.

In step S1308, the system determines whether the operation input from the input unit 18 is "continuation" or "cancellation". If the user selects "continuation", the system writes the program on the recording medium (S1309). Upon completion of this writing operation, the process returns to step S1001.

If the user selects "cancellation", the process returns to step S1001 without performing writing processing.

According to the above embodiment, issuing a warning concerning label printing on a recording medium before writing of multimedia data such as a recorded program on the recording medium makes it possible to avoid a situation wherein label printing cannot be performed. This makes it possible to properly and reliably perform writing of a recorded program and label printing with respect to a recording medium.

[Modification of First Embodiment]

Figure 5:
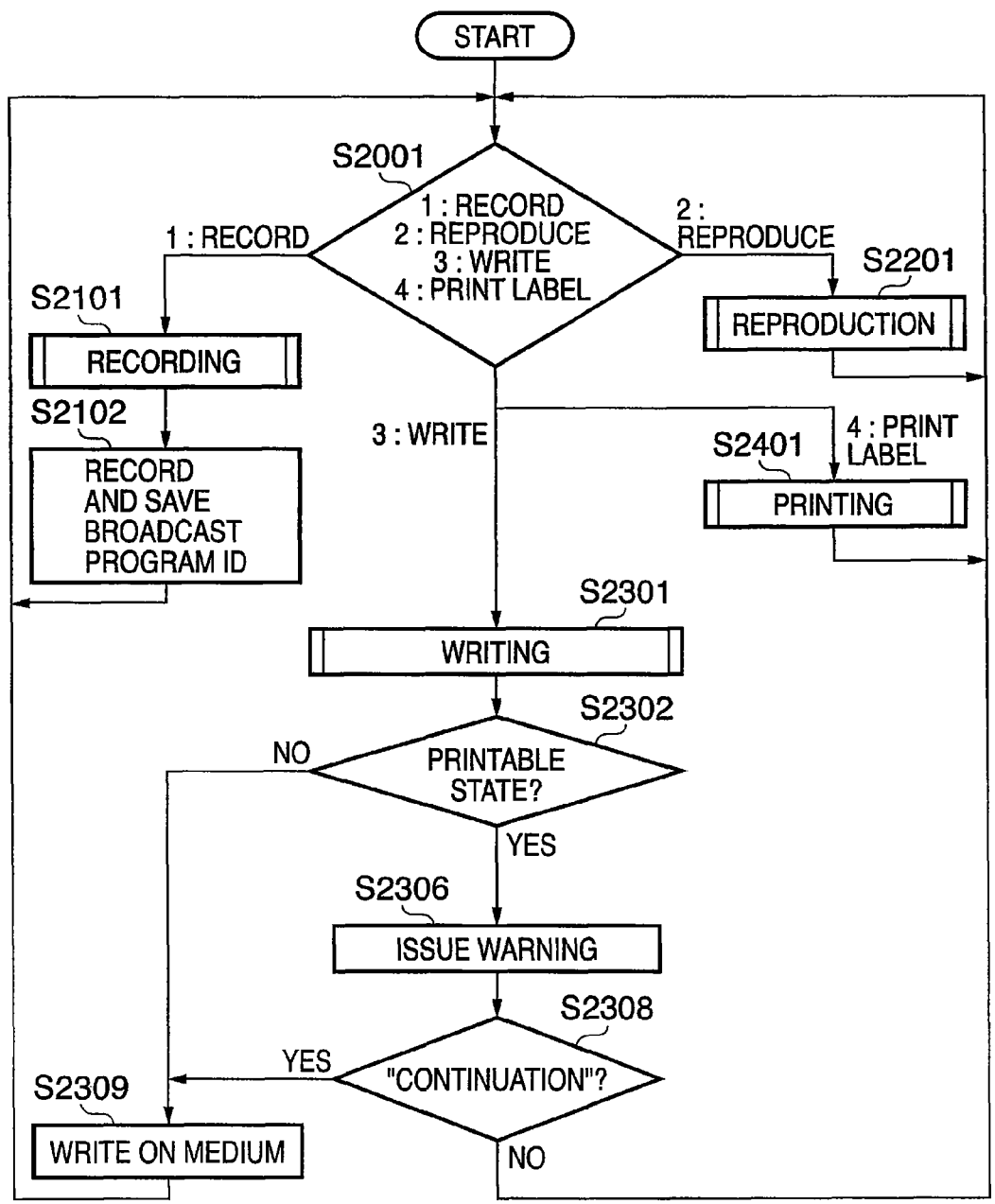
FIG. 5 is a flowchart showing warning processing at the time of label printing in a modification of the first embodiment.

FIG. 5 is a flowchart showing warning processing at the time of label printing in a modification of the first embodiment.

This modification issues a "warning" only in a "label printable state". That is, in a state wherein label printing cannot be performed when the printer is not connected, this system does not issue any warning to prompt to perform label printing. Such operation is performed because some users pay no attention to the finishing of a DVD, and it seems to be unnecessary to issue a warning to such users.

The operations in steps S2001, S2101, S2102, S2201, S2301, S2306, and S2308 in FIG. 5 are the same as those in steps S7001, S7101, S7102, S7201, S7301, S7309, and S7401 described with reference to in FIG. 10. In steps S2309 and S2401 in FIG. 5, this system performs the same operations as those in steps S1306 and S1308 described with reference to FIG. 4. A repetitive description of these operations will therefore be omitted.

When the user selects "3: write" in step S2001 in FIG. 5, the system activates the writing module (S2301). The system determines whether the current state is a printable state wherein a recording/reproducing apparatus 2 connects to a printer 4 through a communication unit 24 (S2302). If the current state is not the printable state, the process advances to step S2309. If the current state is the printable state, the process advances to step S2306 to issue a warning.

According to the above modification, only when the "label printable state" is set, the system issues a "warning". This makes it possible to reduce the number of times of occurrence of unnecessary warnings while properly and reliably performing writing of a recorded program and label printing with respect to a recording medium.

Note that the system may perform determination on the "printable state" in step S2302 in FIG. 5 by using, for example, information indicating whether "the printer 4 is in a printable state", "label printing has been performed by using printer 4 before", or "printer 4 has been connected before".

[Second Embodiment]

Figure 6:
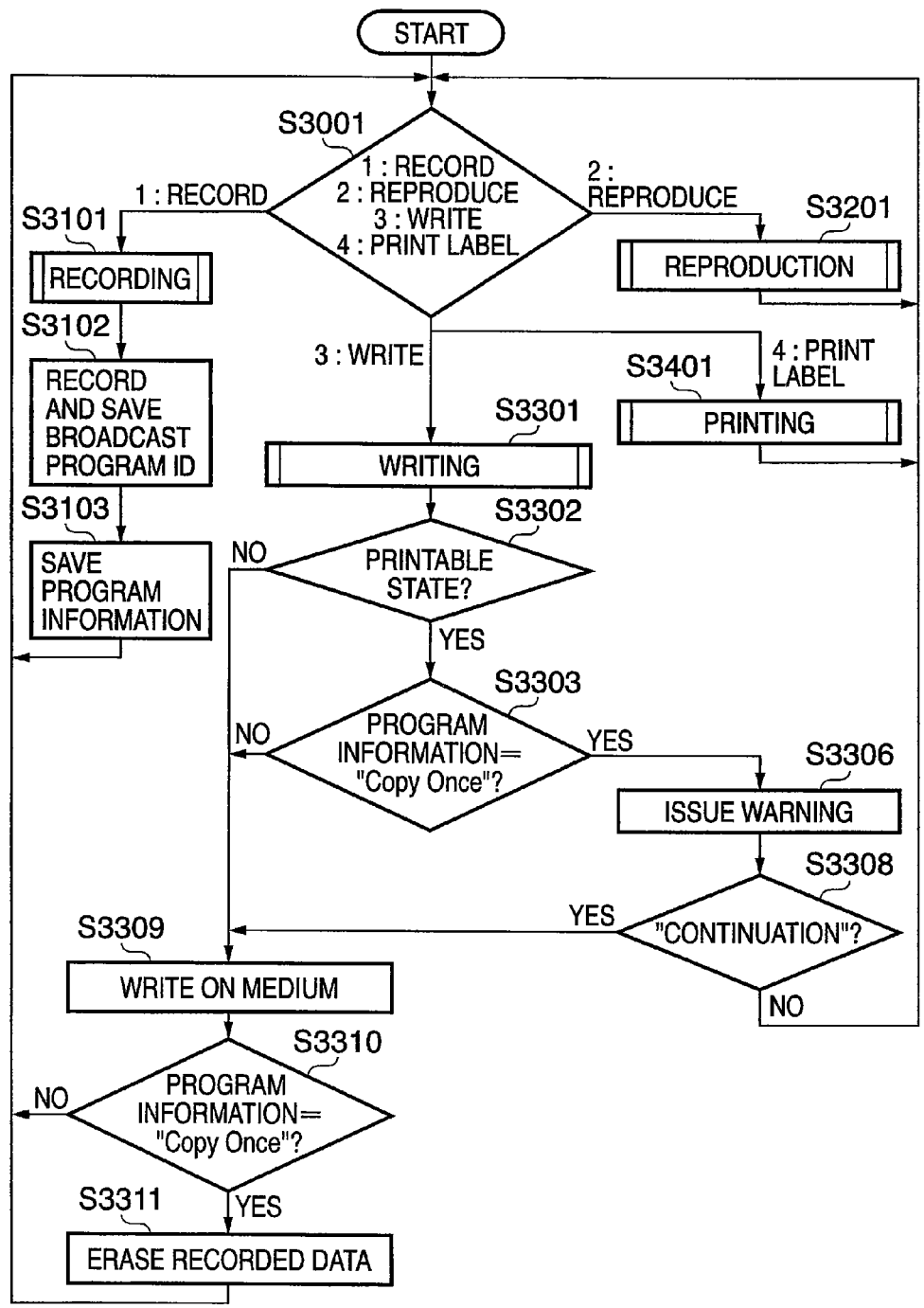
FIG. 6 is a flowchart showing warning processing at the time of label printing in the second embodiment.

FIG. 6 is a flowchart showing warning processing at the time of label printing in the second embodiment.

This embodiment issues a "warning" when "writing of a recorded program on a recording medium a plurality of number of times is inhibited". This is because when there is no restriction on writing of a broadcast program, even if a label printing failure occurs, there is no need, in particular, to issue a warning, because the system can perform label printing.

The operations in steps S3001, S3101, S3102, S3201, S3301, S3309, and S3401 in FIG. 6 are the same as those in steps S7001, S7101, S7102, S7201, S7301, S7309, and S7401 described with reference to FIG. 10. In addition, the operations in steps S3302, S3306, and S3308 in FIG. 6 are the same as those in steps S2302, S2306, and S2308 described with reference to FIG. 5. A description of these operations will therefore be omitted.

First of all, in step S3103 in FIG. 6, the system records a program and saves program information 53 contained in the recorded program.

When the user selects "3: write" in step S3001, the system activates the writing module (S3301). If the current state is a printable state (S3302), the system determines whether "writing of the recorded program on the recording medium a plurality of number of times is inhibited" (S3303). The system performs this determination by referring to the program information 53 in the label printing management table 50 in FIG. 3 and determining whether the recorded program is a "Copy Once" program. If the system determines in step S3303 that writing of the recorded program a plurality of number of times is inhibited, the process advances to step S3306 to issue a warning.

After the program is written on the medium in step S3309, the process advances to step S3310 to perform the same determination as in step S3303. If the determination result in step S3310 is the same as that in step S3303, the system erases the recorded program written on the medium (S3311).

If the system determines in step S3303 that writing of the program a plurality of number of times is not inhibited, the process advances to step S3309. The process then returns to step S3001 without erasing the recorded program.

According to the above embodiment, if "writing of the recorded program on the recording medium a plurality of number of times is inhibited", the system issues a "warning" to allow the user to reduce the number of times of occurrence of unnecessary warnings while properly and reliably performing writing of the recorded program and label printing with respect to the recording medium.

In this embodiment, when determining that "writing of a recorded program a plurality of number of times is inhibited", the system determines whether the program information is "Copy Once", that is, whether label printing is permitted only once. However, the present invention is not limited to this. That is, the present invention can be applied to, for example, a case wherein the number of times that writing is permitted is limited to two or more, the period during which writing is permitted is limited, and a restriction on a writable period is set in a recorded program itself.

In addition, when a restriction is imposed on the number of times of writing, it suffices to issue a warning only "when the last writing operation is performed".

[Third Embodiment]

Figure 7:
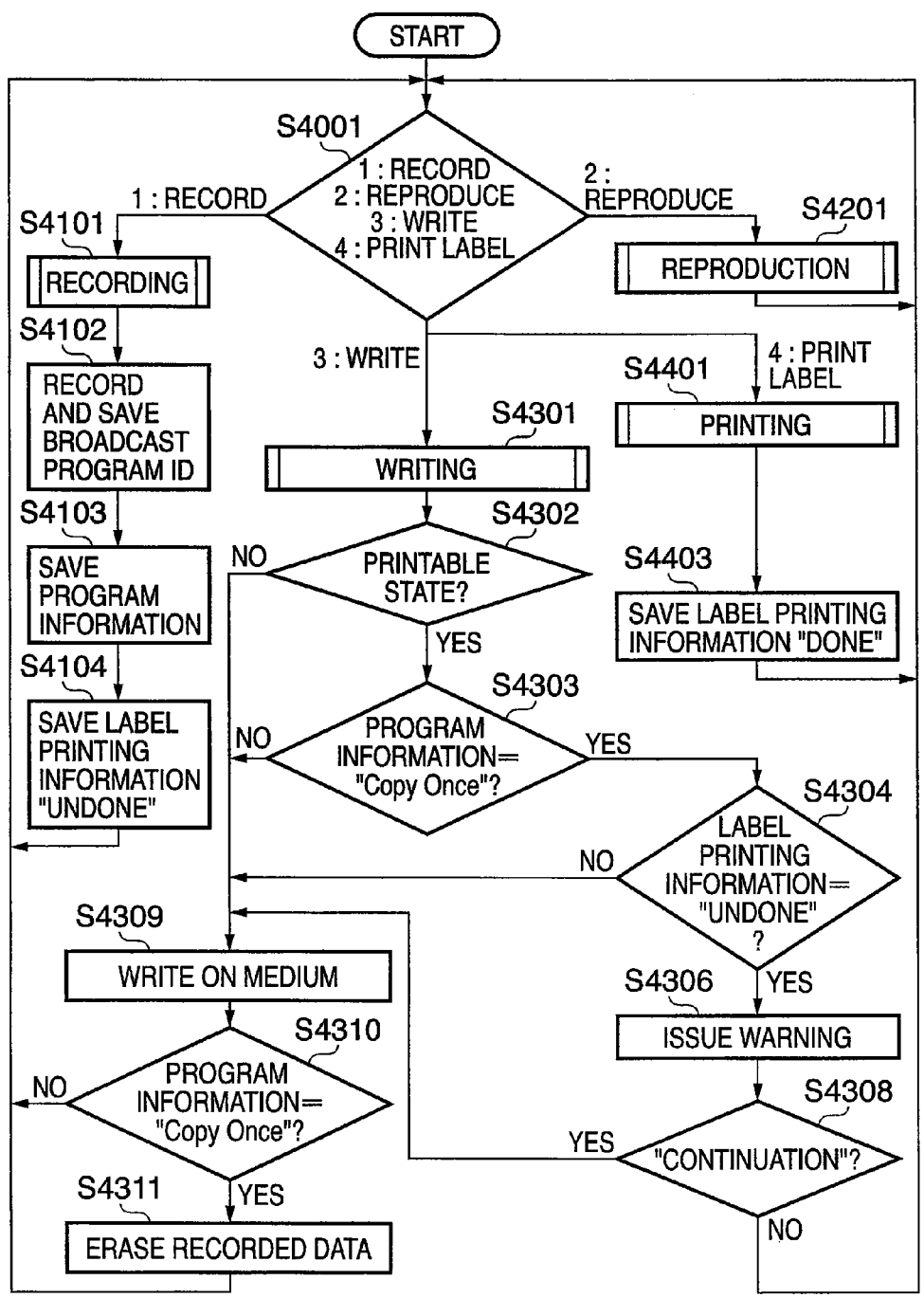
FIG. 7 is a flowchart showing warning processing at the time of label printing in the third embodiment.

FIG. 7 is a flowchart showing warning processing at the time of label printing in the third embodiment.

This embodiment issues a "warning" against a "recorded program on which no label has been printed". This is because there is no need to issue any warning again against a recorded program on which a label has already been printed.

The operations in steps S4001, S4101, S4102, S4201, S4301, S4309, and S4401 in FIG. 7 are the same as those in steps S7001, S7101, S7102, S7201, S7301, S7309, and S7401 described with reference to FIG. 10. In addition, the operations in steps S4103, S4302, S4303, S4306, S4308, S4310, and S4311 are the same as those in steps S3103, S3302, S3303, S3306, S3308, S3310, and S3311 described with reference to FIG. 6. A description of these operations will therefore be-omitted.

First of all, in step S4104 in FIG. 7, the system records a program and saves "undone" in label printing information 54 in a label printing management table 50 in FIG. 3 because label printing has not been performed.

If the user selects "3: write" in step S4001, the system activates the writing module (S4301). If a label can be printed (S4302) and writing of a program a plurality of number of times is inhibited (S4303), the system determines whether the recorded program is a program on which no label has been printed. More specifically, the system determines whether "undone" is saved in the label printing information 54 in the label printing management table 50. If the system determines in step S4304 that "undone" is saved in the label printing information, the process advances to step S4306 to issue a warning.

If the system determines in step S4304 that the label printing information is "done", the processing advances to step S4309 without issuing any warning.

If the user selects "4: print label" in step S4001, the system activates the printing module (S4401). Upon completing label printing, the system saves "done" as the label printing information 54 in the label printing management table 50 with respect to the recorded program on which a label has been printed. With this operation, when writing the recorded program including the label printing information "done", the system writes the program on a medium without issuing any warning because the system determines "NO" in step S4304 (S4309).

If the system issues a "warning" regardless of whether label printing is to be performed, the system issues a "warning" every time the user selects "3: write". This will reduce the convenience of the system, and may confuse the user to make him/her wonder "why a warning is issued even after proper label printing".

In contrast to this, according to the above embodiment, issuing a "warning" against a "recorded program on which no label has been printed" makes it possible to reduce the number of times of occurrence of unnecessary warnings while properly and reliably performing writing of a recorded program and label printing with respect to a recording medium.

According to the description made with reference to FIG. 7, the system performs processing as a form of a combination of the first and second embodiments and their modifications. However, the present invention is not limited to this. For example, steps S4302, S4303, S4310, and S4311 may be omitted.

[First Modification of Third Embodiment]

Figure 8:
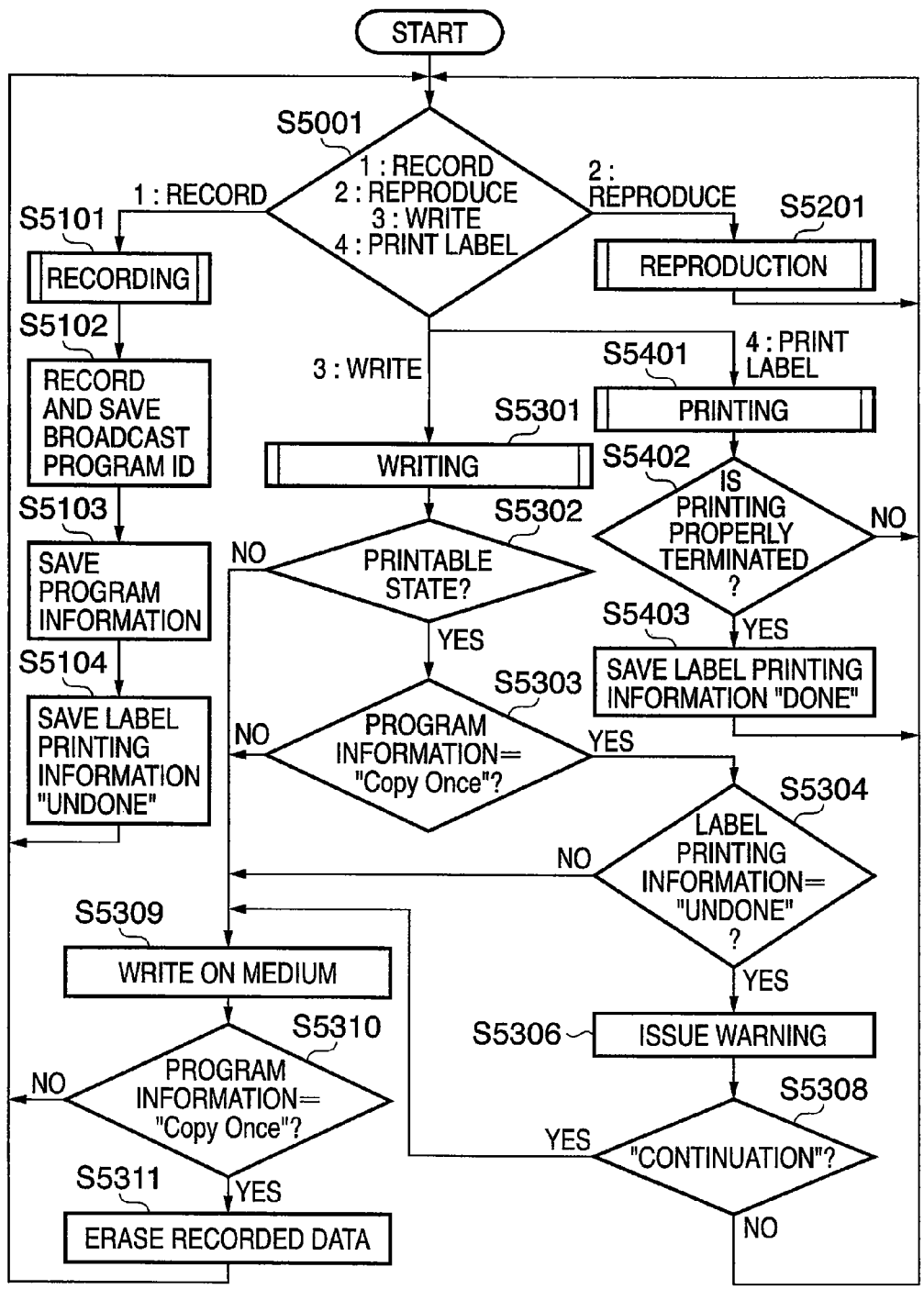
FIG. 8 is a flowchart showing warning processing at the time of label printing in the first modification of the third embodiment.

FIG. 8 is a flowchart showing warning processing at the time of label printing in the first modification of the third embodiment.

This modification issues a "warning" against a "recorded program on which label printing has not been properly terminated".

This is because when a printing failure occurs due to an ink shortage at the time of execution of label printing, disconnection of the cable, or the like, it can be regarded that since label printing is not complete and the recording medium for the recorded program is not complete, it is preferable to continue issuing a warning.

The processing in FIG. 8 is the same as that in FIG. 7 except for step S5402, and hence a repetitive description will be omitted.

If the user selects "4: print label" in step S5001, the system activates the printing module (S5401), and determines whether label printing is properly terminated (S5402). More specifically, the system communicates with a printer 4 through a communication unit 24 to determine whether the print job is terminated without any error.

If label printing is properly terminated, the system saves "done" as label printing information 54 in a label printing management table 50 for the recorded program on which label printing has been done (S5403). This keeps the determination "YES" in step S5304 until label printing is properly terminated. The system therefore issues a warning before writing on a medium (S5306).

According to the above modification, issuing a "warning" against a "recorded program on which label printing has not been properly terminated" makes it possible to reduce the number of times of occurrence of unnecessary warnings while reliably performing label printing on a recording medium.

Note that in this modification, the system determines in step S5402 whether label printing is properly terminated, by communicating with the printer 4. However, the present invention is not limited to this. For example, the system may take a form of displaying a confirmation message like "Is label printing properly terminated?" or "Are you satisfied with the finishing of label printing?" on a monitor 3, display unit 20, or the like, and making the user directly input his/her determination through an input unit 18. This allows the user to, for example, visually check an inconvenience like a failure to detect connection to the printer 4, e.g., misregistration, an abrupt ink discharge failure, or a printing failure due to dust adhering onto a medium.

Referring to. FIG. 8, the system performs processing as a form of a combination of the first and second embodiments and their modifications. However, the present invention is not limited to this. For example, steps S5302, S5303, S5310, and S5311 may be omitted.

[Second Modification of Third Embodiment]

This modification exemplifies a case wherein when the user selects "cancellation" of writing in response to a "warning", the system can perform processing for the recorded program in the order of "4: print label" and "3: write".

The user who has selected "cancellation" should think by himself/herself that "I want to write the recorded program on a recording medium on which a label is properly printed". However, the procedure of selecting the recorded program for label printing, selecting "3: write" again after label printing, and selecting the same recorded program lacks in convenience. In this case, when the user makes an operation error or the like, the system may perform label printing and writing with respect to an erroneous recorded program. That is, the system may not properly and reliably perform writing of a recorded program and label printing with respect to a recording medium. This modification reduces such inconvenience.

The processing from the selection of "cancellation" in step S5308 to step S5001 is the same as that shown in FIGS. 7 and 8.

The process then advances to step S5401 upon automatic selection of "4: print label" without any operation by the user in step S5001, thereby prompting the user to perform label printing with respect to a recorded program for which writing is canceled. Upon determining in step S5402 that label printing is properly terminated, the process advances to step S5403 to save label printing information "done". The process then returns to step S5001.

Subsequently, the process advances to steps S5301 to S5304 upon automatic selection of "3: write" without any operation by the user in step S5001. Since NO is obtained in step S5304, the process advances to step S5309 to write the program on the medium.

According to the above embodiment, when the user selects "cancellation" in response to a "warning", the system performs processing for the recorded program in the order of "4: print label" and "3: write", thereby reducing inconveniences such as performing label printing and writing of an erroneous recorded program due to an operation error or the like by the user. After "cancellation", the user can perform writing of a recorded program and label printing with respect to a recording medium with simple operation.

Referring to FIG. 8, the system performs processing as a form of a combination of the first and second embodiments and their modifications. However, the present invention is not limited to this. For example, steps S5302, S5303, S5310, and S5311 may be omitted.

Although issuing a warning twice may confuse the user, it can reduce operation errors made by the user. This makes it possible to omit steps S5104, S5304, S5402, and S5403.

[Fourth Embodiment]

Figure 9:
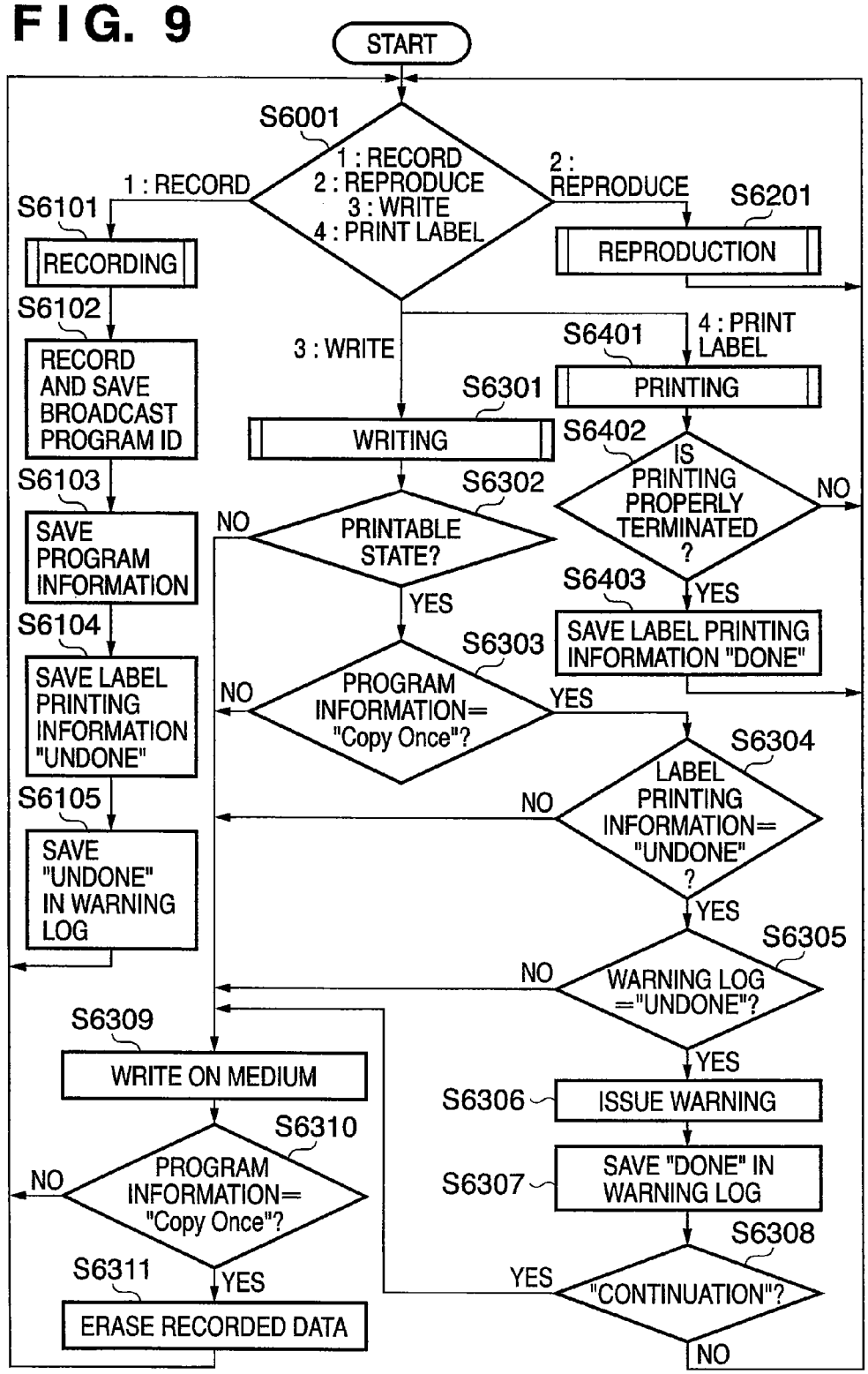
FIG. 9 is a flowchart showing warning processing at the time of label printing in the fourth embodiment.

FIG. 9 is a flowchart showing warning processing at the time of label printing in the fourth embodiment.

This embodiment issues a "warning" against a "recorded program against which no warning has been issued". This is because once the system has issued a warning against a given recorded program, the user has already received the warning, and hence there seems to be no need to issue a warning again against the recorded program.

Since the processing in FIG. 9 is the same as that in FIG. 8 except for steps S6105, S6305, and S6307, a repetitive description will be omitted.

First of all, in step S6105 in FIG. 9, the system records a program and saves "undone" in a warning log 55 in a label printing management table 50 in FIG. 3 because no warning has been issued against the recorded program.

When the user selects "3: write" in step S6001, the system activates the writing module (S6301). Upon determining in step S6034 that the label printing information is "undone", the system determines whether no warning has been issued against the recorded program. More specifically, the system determines whether "undone" is saved in the warning log 55 in the label printing management table 50.

Upon determining in step S6305 that no warning has been issued, the system writes the program on the medium without issuing any warning (S6309).

Upon determining in step S6305 that a warning has already been issued, the system issues a warning, and then saves "done" in the warning log 55 in the label printing management table 50 (S6307). With this operation, since "YES" is obtained in step S6305 until a warning is issued before writing of the recorded program, the system issues a warning (S6306).

According to the above embodiment, issuing a "warning" against a "recorded program against which no warning has been issued" makes it possible to reduce the number of times of occurrence of unnecessary warnings while properly and reliably performing writing of the recorded program and label printing with respect to the recording medium.

According to the description made with reference to FIG. 9, the system performs processing as a form of a combination of the first to third embodiments and their modifications. However, the present invention is not limited to this. For example, steps S6104, S6302, S6303, S6310, S6311, S6402, and S6403 may be omitted.

Obviously, the techniques described in the above embodiments and their modifications can be used singly or in combination with each other.

In addition, in accordance with the situations, these techniques can be selectively used as needed depending on whether, for example, the printer to be used can perform label printing or the recording medium to be used allows label printing. Furthermore, the contents of a warning need not directly be the message "You should perform label printing". That is, any warning can be used as long as it allows the user to acknowledge, memorize, and recognize anew that "When you will not perform label printing", "you cannot perform label printing anymore".

In this embodiment, as recording media other than DVDs, it suffices to use any media which allow label printing, e.g., next-generation media and next-next-generation media of DVDs, and old-generation media such as CDs.

In this embodiment, an inkjet printer is assumed to be used as a printer 4. However, the present invention can be applied to sublimation type printers and laser printers.

In this embodiment, a broadcast program 9 is transferred between a broadcast station 8 and a recording/reproducing apparatus 2. However, the present invention is not limited to the broadcast program 9, and can be equally applied to digital contents which have been downloaded from the Internet or the like and for which "a plurality of number of times of writing is inhibited".

In addition, the broadcast program 9 need not be limited to moving images, and may be still images and audio data typified by music data.

According to the modification of the first embodiment, if the system determines in step S2302 that the current state is not a printable state, the process advances to step S2309 without issuing any warning. This operation aims at simplifying the procedure by skipping the operation of selecting "continuation" simultaneously with issuing a warning. However, the present invention is not limited to this procedure. Even if the procedure is designed to make the user select or not select "continuation" in step S2308, the number of times of occurrence of unnecessary warnings can be reduced, which is the main object of the modification of the first embodiment.

This applies to steps S3302 and S3303 in the second embodiment, steps S4302 to S4304 in the third embodiment, steps S5302 to S5304 in the first modification of the third embodiment, and steps S6302 to S6305 in the fourth embodiment.

[Other Embodiments]

The present invention incorporates a case wherein programs of software for implementing the functions of the embodiments described above are directly or remotely supplied to a system or apparatus to cause the computer of the system or apparatus to read out and execute the programs, thereby implementing the functions. In this case, the computer of the system or the like reads out and executes the computer programs.

The program codes themselves which are installed in the computer to allow the computer to implement the functions/processing of the present invention also implement the present invention.

In this case, each program may take any form, e.g., an object code, a program executed by an interpreter, and script data supplied to an OS, as long as it has the function of the program.

As a recording medium (storage medium) for supplying the programs, a flexible disk, hard disk, optical disk, magnetooptical disk, MO, CD-ROM, CD-R, CD-RW, magnetic tape, nonvolatile memory card, ROM, DVD (DVD-ROM or DVD-R), or the like can be used.

In addition, methods of supplying the programs include the following. A client computer connects to a homepage on the Internet by using a browser to download each computer program of the present invention itself from the homepage or download a compressed file containing an automatic install function into a recording medium such as a hard disk. Alternatively, the programs can be supplied by dividing the program codes constituting each program of the present invention into a plurality of files, and downloading the respective files from different homepages. That is, the present invention also incorporates a WWW server which allows a plurality of users to download program files for causing the computer to execute the functions/processing of the present invention.

In addition, the following operation can be performed. The programs of the present invention are encrypted and stored in a storage medium such as a CD-ROM. Such storage media are then distributed to users. A user who satisfies a predetermined condition is allowed to download key information for decryption from, for example, a homepage through the Internet. The user executes the encrypted programs by using the key information to make the computer install the programs.

The functions of the above embodiments are implemented not only when the readout programs are executed by the computer but also when the OS or the like running on the computer performs part or all of actual processing on the basis of the instructions of the programs.

The functions of the above embodiments are also implemented when the programs read out from the recording medium are written in the memory of a function expansion board inserted into the computer or a function expansion unit connecting to the computer, and the CPU of the function expansion board or function expansion unit performs part or all of actual processing on the basis of the instructions of the programs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-177294, filed Jun. 27, 2006, which is hereby incorporated by reference herein in its entirety.

What is claimed is:

1. A recording apparatus comprising:
a selection unit adapted to select data from a storage medium configured to store a plurality of data;
a writing unit adapted to write the selected data into an optical disk;
a print control unit adapted to execute a control of printing an image on a surface of the optical disk; and
a control unit adapted to control said writing unit to execute a writing process for writing the selected data into the optical disk in response to a writing start instruction from a user, the writing start instruction is an instruction for starting to write the selected data into the optical disk;
wherein, in response to the writing start instruction, said control unit controls said writing unit to start the writing process for writing the selected data into the optical disk if there is not a restriction on the number of times of writing of the selected data, and said control unit controls said writing unit not to start the writing process for writing the selected data into the optical disk and to provide a display for prompting the user to perform an image printing on the surface of the optical disk before the selected data is written into the optical disk if there is a restriction on the number of times of writing of the selected data.

2. The apparatus according to claim 1, wherein the display indicates one of a display for prompting to print on the surface of the optical disk, a display which is displayed when no printing has been done on the surface of the optical disk, a display for execution of writing data in a printable state of the surface of the optical disk, and a display for execution of writing of the selected data when printing on the surface of the optical disk is complete.

3. The apparatus according to claim 1, wherein the display is provided when the recording apparatus connects to a printer.

4. The apparatus according to claim 1, wherein information corresponding to the selected data is printed on the surface of the optical disk.

5. The apparatus according to claim 4, wherein the information which corresponds to the selected data and is printed on the surface of the optical disk includes one of information concerning a date, an image extracted from the selected data, and a title.

6. The apparatus according to claim 1, further comprising a determination unit adapted to determine a printing log of information corresponding to the selected data,
wherein when said determination unit determines from the printing log that the information corresponding to the selected data has been printed, said writing unit writes the selected data into the optical disk.

7. A control method for a recording apparatus, the method comprising the steps of:
selecting data from a storage medium configured to store a plurality of data;
writing the selected data into an optical disk;

executing print control of printing an image on a surface of the optical disk; and executing write control of a writing process for writing the selected data into the optical disk in response to a writing start instruction from a user, the writing start instruction is an instruction for starting to write the selected data into the optical disk, wherein, in response to the writing start instruction, said executing write control step controls to start the writing process for writing the selected data into the optical disk if there is not a restriction on the number of times of writing of the selected data, and said executing write control step controls not to start the writing process for writing the selected data into the optical disk and to provide a display for prompting the user to perform an image printing on the surface of the optical disk before the selected data is written into the optical disk if there is a restriction on the number of times of writing of the selected data.

8. The method according to claim 7, wherein the display indicates one of a display for prompting to print on the surface of the optical disk, a display which is displayed when no printing has been done on the surface of the optical disk, a display for execution of writing data in a printable state of the surface of the optical disk, and a display for execution of writing of the selected data when printing on the printing surface is complete.

9. The method according to claim 7, wherein the display is provided when the recording apparatus connects to a printer.

10. The method according to claim 7, wherein information corresponding to the selected data is printed on the surface of the optical disk.

11. The method according to claim 10, wherein the information which corresponds to the selected data and is printed on the surface of the optical disk includes one of information concerning a date, an image extracted from the selected data, and a title.

12. The method according to claim 7, further comprising the step of determining a printing log of information corresponding to the selected data, wherein when it is determined in the determining step from the printing log that the information corresponding to selected data has been printed, the selected data is written into the optical disk.

13. A program stored on a non-transitory computer-readable storage medium for causing a computer to execute a control method defined in claim 7.

14. A non-transitory computer-readable storage medium storing a program causing a computer to execute the control method defined in claim 7.

* * * * *